(12) United States Patent
Ochi

(10) Patent No.: US 6,786,069 B2
(45) Date of Patent: Sep. 7, 2004

(54) STEERING LOCK APPARATUS

(75) Inventor: Isao Ochi, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 10 days.

(21) Appl. No.: 10/283,156

(22) Filed: Oct. 30, 2002

(65) Prior Publication Data
US 2003/0079509 A1 May 1, 2003

(30) Foreign Application Priority Data
Oct. 31, 2001 (JP) .................................... 2001-335856

(51) Int. Cl.⁷ .......................................... B60R 25/02
(52) U.S. Cl. .............................. 70/252; 70/189; 70/257
(58) Field of Search .......................... 70/180–189, 252, 70/257

(56) References Cited

U.S. PATENT DOCUMENTS

| 4,981,026 | A | * | 1/1991 | Sakuno et al. | 70/186 |
| 5,036,687 | A | * | 8/1991 | Takeuchi et al. | 70/186 |
| 5,117,664 | A | * | 6/1992 | Kurozu et al. | 70/186 |
| 5,974,841 | A | * | 11/1999 | Naganuma | 70/186 |
| 6,076,382 | A | * | 6/2000 | Naganuma | 70/186 |
| 6,233,986 | B1 | * | 5/2001 | Suzuki et al. | 70/186 |
| 6,237,378 | B1 | * | 5/2001 | Canard | 70/186 |
| 6,354,117 | B1 | * | 3/2002 | Canard | 70/186 |
| 6,516,640 | B2 | * | 2/2003 | Jacobs et al. | 70/186 |
| 6,604,392 | B1 | * | 8/2003 | Kiso et al. | 70/186 |

FOREIGN PATENT DOCUMENTS

JP 3029059 4/1993

* cited by examiner

Primary Examiner—Daniel P. Stodola
Assistant Examiner—Christopher Boswell
(74) Attorney, Agent, or Firm—Wenderoth, Lind & Ponack, L.L.P.

(57) ABSTRACT

A steering lock apparatus includes a cylinder having a key insertion hole 14a and which can be rotated by insertion of the key; a rotor 18 having an engagement groove 30 formed on an outer circumferential portion and holding the cylinder 20 rotatably; a body 12 housing the cylinder 20 and the rotor 18 movably in forward and backward direction and rotatably in a rear position; a detection element 52 for detecting pushing of the cylinder 20 toward a rear side; an actuator 26 that operates upon reception of an operating signal transmitted by a control portion 54 that receives a detection signal from the detection portion 52, executes electronic certification with a portable device 56, and transmits the operating signal upon recognition of certification; a lock member 28 operated by the actuator 26 so as to be engaged with the engagement groove 30 of the rotor 18 for preventing rotation of the rotor 18; and a key detection member 60, 65 disposed so as to block at least part of the key hole 14a and operated by insertion of the key into the cylinder 20 so as to protrude outside from an inner circumferential wall of the body 12, the body 12 being provided with a receiving recess portion 67 for receiving the protruding key detection member 65 when the cylinder 20 is in the rear position.

8 Claims, 14 Drawing Sheets

STEERING LOCK APPARATUS

BACKGROUND OF THE INVENTION

The present invention relates to a steering lock apparatus for use in vehicles such as automobiles.

Among steering lock apparatuses that determine if a user is an authorized user with an electronic certificate function using an electronic key to unlock a steering lock and permit the start of the engine, there has conventionally been known one that is equipped with a knob for rotating a cylinder lock without need of a mechanical key. This type of steering lock apparatus includes one that executes electronic certification upon detection of a knob being pushed, and operates an actuator that is locking rotation of the cylinder lock upon recognition of certification, to put the cylinder lock in a rotatable state and permit unlocking of the steering lock. This steering lock apparatus is also structured to enable unlocking of the steering lock with use of a mechanical key in case of failure of the electronic key and the like.

As shown in FIG. 17, this steering lock apparatus 100 is provided with an approximately cylinder-shaped body 101, and a cylinder lock 102 is attached on the front inside of the body 101. The cylinder lock 102 is composed of a cylinder-shaped outer cylinder 103 fixed in the body 101, a cylinder-shaped rotor 105 housed in the outer cylinder 103 so as to be rotable as well as movable in forward and backward directions (right and left direction in FIG. 17), and a column-shaped cylinder 108 rotatably housed in the rotor 105.

The cylinder 108, which is the same as typical cylinder locks, has a plurality of tumblers 109 that are sunk by insertion of a mechanical key. When the mechanical key is not inserted, the tumbler 109 protruding from the cylinder 108 engages a lock groove 106 formed on the inner circumferential face of the rotor 105, which prevents the cylinder 108 from rotating inside the rotor 105. In a front end portion of the cylinder 108, there is formed a brim-like portion 110 protruding like a flange, which is structured to hold the rotor 105 together with a C ring 112 attached and fixed to a rear end portion of the rotor 105 interposed between the brim-like portion 110 and the C ring 112, by which the rotor 105 and the cylinder 108 can implement integral operation in forward and backward direction. In the front end portion of the cylinder 108, there is a knob 113 for rotating the cylinder lock 102 without need of a mechanical key, and the knob 113 has slit-shaped internal space, through the mechanical key is insertable into the cylinder 108.

The rear end portion of the cylinder 108 connected to a shaft 115 integrally formed with a cam 116, like typical steering lock apparatuses. By rotation of the shaft 115, the cam 116 operates a lock shaft 117 that unlocks an unshown steering shaft, by which the steering lock can be unlocked.

On the outer circumferential face of the rotor 105, there is an engagement groove 107 that engages with a lock lever 121 operated by a solenoid 120 for preventing the rotor 105 from rotating. In unlocking with an electric key, the solenoid 120 operates so that engagement of the rotor 105 and the lock lever 121 is released, rotation of the knob 113 rotates the cylinder 108 and the rotor 105 together to allow unlocking of the steering lock. In unlocking with a mechanical key, upon insertion of the mechanical key and rotation thereof, only the cylinder 108 is structured to be rotated to allow unlocking of the steering lock.

Also, the steering apparatus 100 is equipped with an unshown detection means for detecting pushing of the knob 113, and an unshown controller that operates upon detection by the detection means, executes electronic certification through exchanging signals by radio with the electronic key, and transmits an operating signal to the solenoid 120 upon recognition of certification.

To unlock the steering lock with use of an electronic key, a driver having the electronic key pushes the knob 113. Consequently, the detection means detects the pushing operation of the knob 113 and operates the controller. Upon recognition of certification of the electronic key by the controller, the solenoid 120 is operated to pull up the lock lever 121 that engages with the engagement groove 107, by which engagement of the lock lever 121 and the engagement groove 107 is released. This allows rotation of the rotor 105, so that rotating operation of the knob 113 rotates the cylinder 108, the rotor 105 and the shaft 115 to unlock the steering lock.

In the above structure, if the knob 113 is rotated when the solenoid 120 is operated and the lock lever 121 is detached from the engagement groove 107, a lateral wall of the engagement groove 107 may come into contact with the lock lever 121 and catch the lock lever 121, which causes a problem that the rotor 105 is not unlocked even if the solenoid 120 is operated. For solving this problem, there is an apparatus which prevents rotation of the cylinder 108 and the rotor 105 when the lock lever 121 is detached from the engagement groove 107 so as to ensure detachment of the lock lever 121 from the engagement groove 107.

More specifically, there is formed an engagement groove 111 penetrating in the axis direction on the outer circumferential portion of the brim-like portion 110 of the cylinder 108, and there is an engagement protruding portion 104 on the inner circumferential face of the outer cylinder 103 which fits into the engagement groove 111 and interrupts rotation of the cylinder 108. The engagement protruding portion 104 is disposed such that engagement of the engagement groove 111 and the engagement protruding portion 104 is released when the cylinder 108 is pushed and moved to a rear position shown in FIG. 18. This enables rotation of the cylinder 108 only in the rear position. When the knob 113 is pushed from the state before operation and the cylinder 108 being moved to the rear position, the detection means detects pushing of the knob 113 and operates the controller, and the controller finally operates the solenoid 120 so as to detach the lock lever 121 from the engagement groove 107 of the rotor 105. This makes it possible to prevent occurrence of the above problem.

Thus, according to the structure allowing rotation of the cylinder 108 only in the rear position, unlocking with use of a mechanical key is implemented such that the mechanical key is inserted into the cylinder 108 so as to sink the tumbler 109 into the cylinder 108, which enables rotation of the cylinder 108 against the rotor 105. Then the cylinder 108 is moved to the rear position by pushing the cylinder 108 with the mechanical key so as to release engagement of the engagement protruding portion 104 of the cylinder outer 103 and the engagement groove 111 of the cylinder 108, which enables rotating operation of the cylinder 108 to unlock the steering lock.

However, in the above-described type of steering lock apparatus, the cylinder needs to be moved to a rear position where rotation of the cylinder is allowed after the mechanical key is inserted. If the cylinder is not infallibly moved, rotating operation is not available even with the mechanical key being inserted, which causes a problem of failure of unlocking of the steering lock.

SUMMARY OF THE INVENTION

Accordingly, in view of this problem, it is an object of the present invention to provide a steering lock apparatus in which a cylinder lock is infallibly moved to a rear position and held therein when a mechanical key has been inserted into the cylinder lock so as to prevent occurrence of operation failure and the like.

In order to achieve the above object, the present invention is composed of a cylinder having a key insertion hole and becoming rotatable by insertion of the key, a rotor rotatably holding the cylinder and having an engagement groove formed on an outer circumferential portion, a body for housing the cylinder and the rotor movably in forward and backward direction and rotatably in a rear position, a detection element for detecting pushing of the cylinder toward a rear side, an actuator that operates upon reception of an operating signal transmitted by a control element that receives a detection signal from the detection element, executes electronic certification with a portable device, and transmits the operating signal upon recognition of certification, a lock member operated by the actuator and which prevents rotation of the rotor by engagement with the engagement groove of the rotor, and a key detection member disposed so as to block at least part of the key hole and operated by insertion of the key into the cylinder so as to protrude outside from an inner circumferential wall of the body. The body has a receiving recess portion for receiving the protruding key detection member when the cylinder is in the rear position.

In such structure, insertion of the key moves the cylinder to the rear position where the cylinder is rotatable. In this rear position, insertion of the key becomes possible and the cylinder becomes rotatable, which prevents failure of the cylinder to rotate even though the key is inserted.

In the steering lock apparatus of the present invention, the key detection member may be composed of a slider provided in the cylinder whose top end portion is operated from inside of the cylinder to a position identical to an outer circumferential face of the cylinder by insertion of the key, and a slide pin provided in the rotor. One end side of the slide pin comes into contact with at least the top end portion of the slider, and the other end of the slide pin protrudes from an outer circumferential face of the rotor when the slider is operated by insertion of the key.

In such structure, insertion of the key causes the slide pin to cross over the rotor and the body, so that even if engagement of the engagement groove of the rotor and the lock member is released, rotation of the rotor by frictional force generated during rotation of the cylinder can be prevented, thereby making it possible to hold the rotor in a specified position.

There may also be provided a pressing member pressing the key detection member toward an internal side of the cylinder.

In such structure, the key detection member can be infallibly returned to the state prior to insertion of the key when the key is extracted.

The pressing member may be a key detection switch provided inside the receiving recess portion of the body for detecting insertion of the key, which presses the slide pin to a position where one end of the slide pin matches with the outer circumferential face of the rotor when the key is extracted.

In such structure, it is not necessary to separately provide a pressing means such as springs, and the slide pin and the key detection switch do not obstruct rotation of the rotor.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
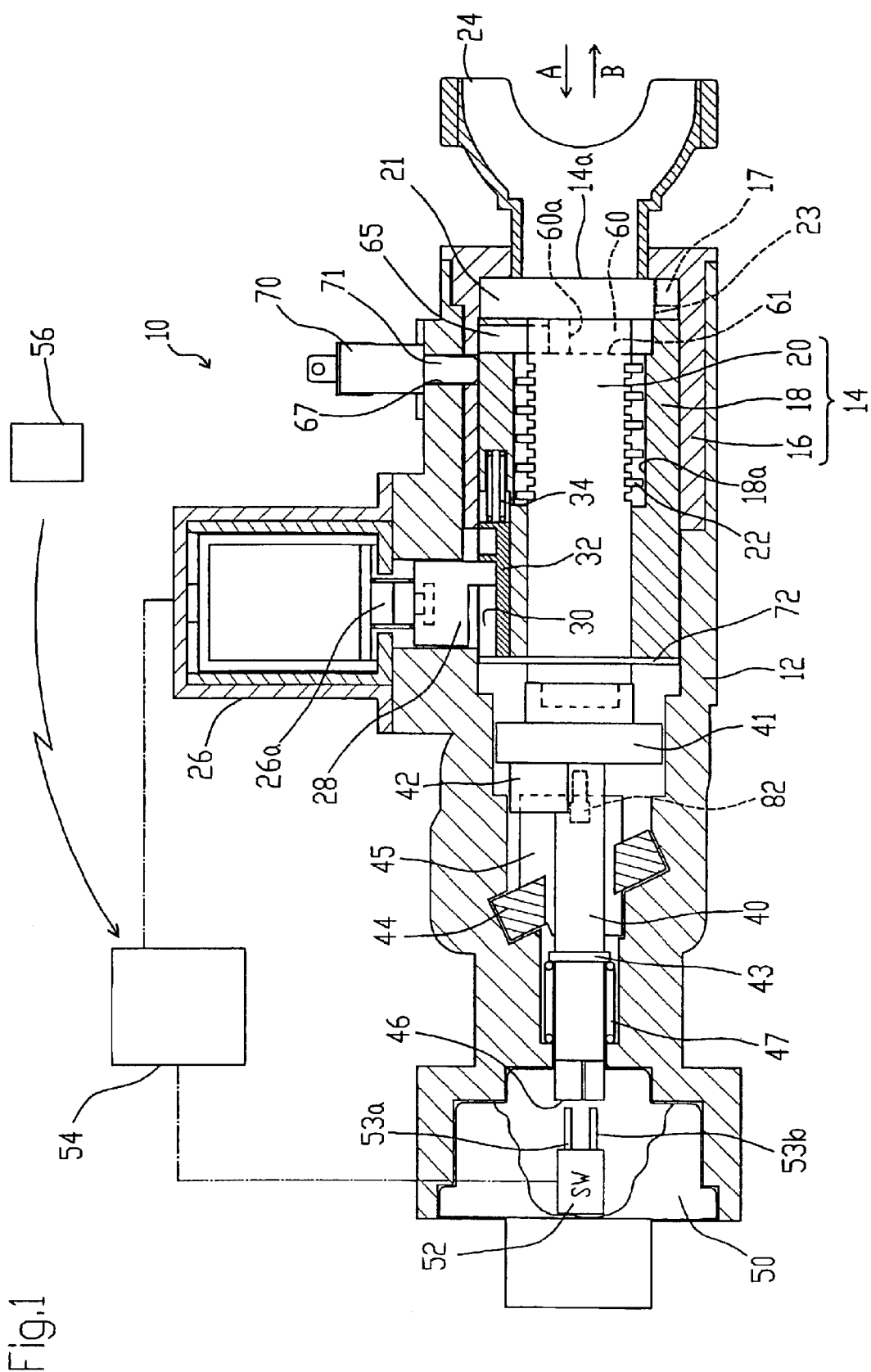
FIG. 1 is a longitudinal cross sectional view showing a steering lock apparatus of the present invention.

FIG. 1 is a longitudinal cross sectional view showing a steering lock apparatus 10 as an embodiment of the present invention movable in forward and backward directions. It is noted that in FIG. 1 (as well as in FIGS. 2, 7, 10, 11, 13, and 14), the right side is referred to as "front" and the left side is referred to as "rear" for the sake of convenience.

The steering lock apparatus has an approximately cylinder-shaped body 12 that is integrally formed from metal such as zinc. On the front inside of the body 12, there is mounted a cylinder lock 14. The cylinder lock 14 is composed of a cylinder-shaped outer cylinder 16 (part of the body) fixed on the body 12, a cylinder-shaped rotor 18 rotatably housed in the outer cylinder 16 and movably in forward and backward directions and a column-shaped cylinder 20 rotatably housed in the rotor 18.

On a front end portion of the cylinder 20, there is formed a brim-like portion 21 having an outer diameter almost equal to an inner diameter of the cylinder outer 16 and protruding like a flange. On the outer circumferential portion of the brim-like portion 21, there is provided an engagement groove 23 formed in an axis direction of the cylinder 20. Into the engagement groove 23, there is fit a engagement protruding portion 17 on an inner circumferential wall of the cylinder outer 16 is fit for preventing rotation of the cylinder 20 in the state shown in FIG. 1 (i.e., the state that the cylinder 20 is not pushed). The engagement state of the engagement groove 23 of the cylinder 20 and the engagement protruding portion 17 of the outer cylinder 16 is released when the cylinder 20 is operated toward the rear side so as to be in the state shown in FIG. 7, so that only in the state that the cylinder 20 is operated to the rear side, rotating operation of the cylinder 20 is allowed.

Figure 12:
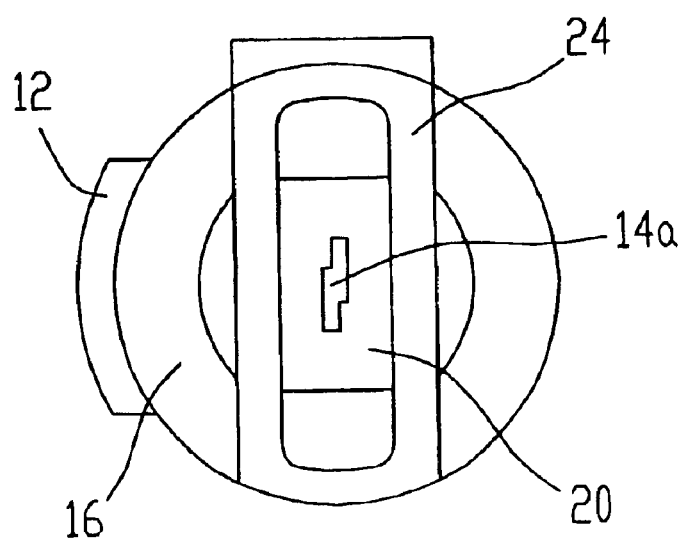
FIG. 12 is a front view showing the front side of the steering lock apparatus of FIG. 1.

As shown in FIG. 1, inside the cylinder 20 there are disposed a plurality of (10 in the present embodiment) board-shaped tumblers 22 spaced at equal intervals along an axis direction of the cylinder 20. Each tumbler 22 is pressed to alternately different directions in direction orthogonal to an axis direction of the cylinder 20 by an unshown spring. When a mechanical key is not inserted into a key hole 14a (see FIG. 12) of the cylinder lock 14, each edge portion of the tumblers 22 protrudes from both sides of the outer circumferential face of the cylinder 20. The protruding edge portion of the tumbler 22 engages with a lock groove 18a formed on the inner circumferential face of the rotor 18, which prevents the cylinder 20 from rotating inside the rotor 18, and which allows the cylinder 20 to rotate together with the rotor 18 when rotation of the rotor 18 is permitted. When a mechanical key is inserted into the key hole 14a of the cylinder lock 14, each tumbler 22 moves toward inside of the cylinder 20, and each protruding edge portion of the tumblers 22 retracts from the outer circumferential face of the cylinder 20. This releases engagement of each tumbler 22 and the lock groove 18a of the rotor 18, thereby enabling the cylinder 20 to rotate inside the rotor 18.

A knob 24 is installed on the front end portion of the cylinder 20. The knob 24 has a slit-shaped internal space, through which a mechanical key is insertable into the key hole 14a of the cylinder 20. When the cylinder 20 is rotatable in the rotor 18, a user can rotate the knob 24 to put the cylinder 20 in each position including a lock position, an ACC position, an On position, and a start position. Further, as described later, when rotation of the rotor 18 in the cylinder outer 16 is permitted, a user can rotate the knob 24 to put the rotor 18 together with the cylinder 20 in each position including the lock position, the ACC position, the On position, and the start position.

On the upper portion of the body 12, there is fixed a solenoid 26 as an actuator. A plunger 26a of the solenoid 26, there is attached a lock lever (lock member) 28. When the solenoid 26 is not operated, the lock lever 28 is positioned as shown in FIG. 1, while when the solenoid 26 is operated, the lock lever 28 is lifted up by the plunger 26a.

Figure 3:
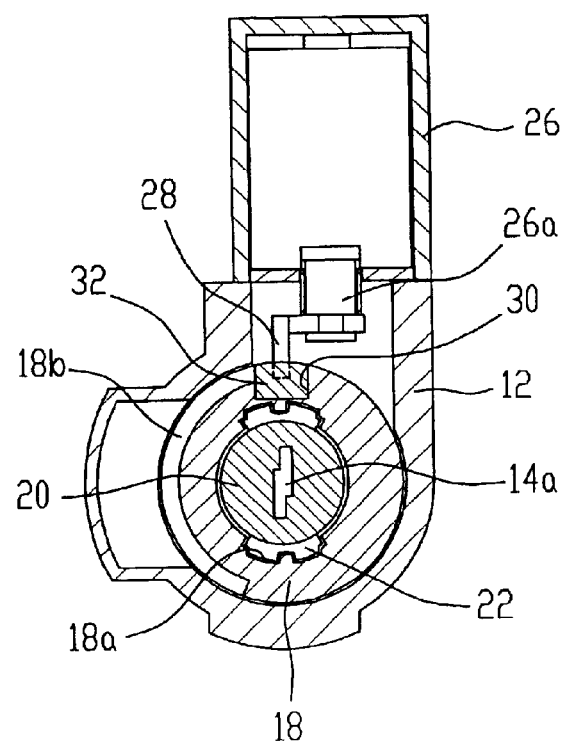
FIG. 3 is a transverse cross sectional view showing the steering lock apparatus of FIG. 1.
Figure 4:
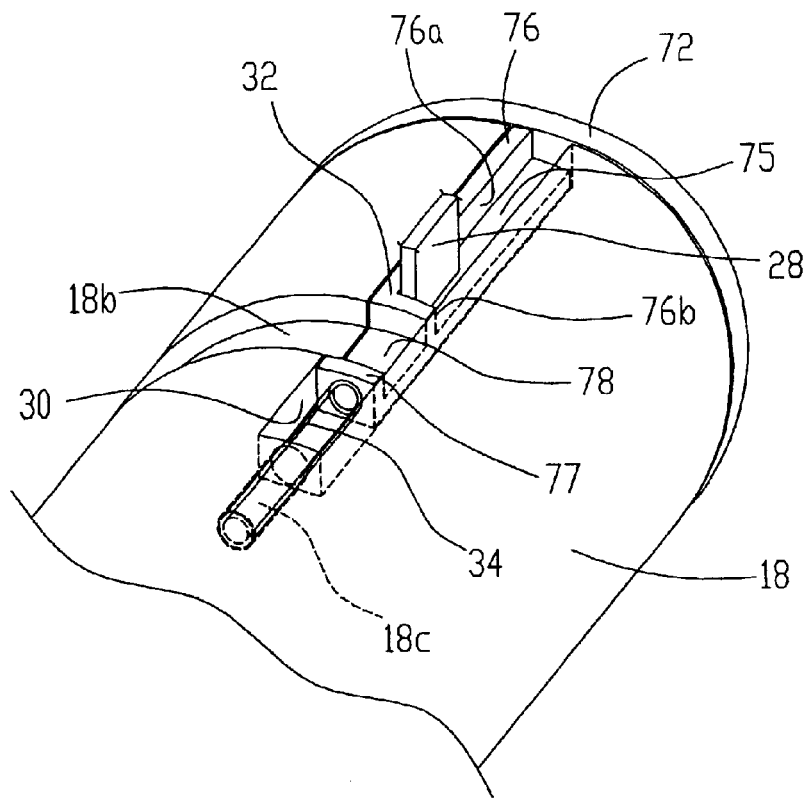
FIG. 4 is an enlarged fragmental perspective view of FIG. 1.

As shown in FIGS. 1 and 3, an engagement groove 30 is formed in the rear outer circumferential portion of the rotor 18. When the solenoid 26 is not in an operating state, the top end portion of the lock lever 28 engages with the engagement groove 30. This prevents rotation of the rotor 18. As shown in FIG. 4, the engagement groove 30 extends from a rear end portion to a central portion of the outer circumferential wall of the rotor 18, and a spring installation hole 18c for installing a later-described spring 34 is formed in axis direction on a lateral wall portion on the central side of the engagement groove 30. Also, in a position of the outer circumferential wall of the rotor 18 corresponding to the top end portion of the lock lever 28 when the rotor 18 is moved to the rear position, there is formed an operating groove 18b, one end of which communicates with the engagement groove 30, while the other end of which extends in a circumferential direction in the range of operation of the rotor 18 (i.e., approx. 160 degrees as shown in FIG. 3).

In the engagement groove 30 of the rotor 18, a movable member 32 is slidably disposed. As shown in FIG. 4, detachment of the movable member 32 from the engagement groove 30 is restricted by the lateral wall of a C ring 72 secured on the rear end portion of the cylinder 20, and the spring 34 presses the movable member 32 toward the C ring 72 side.

The movable member 32 is provided with a substrate portion 75 and an approximately L-shaped engagement protruding portion 76 protruding from the top face of the substrate portion 75. On a lateral wall portion of the engagement protruding portion 76, there are provided a rotation preventing portion 76a engages the lock lever 28 to prevent clockwise rotation of the rotor 18, and a movement preventing portion 76b engages the lock lever 28 to prevent movement of the movable member 32 toward the C ring 72. Also, on the edge portion on the spring 34 side of the substrate portion 75, a board-shaped protruding portion 77 protrudes from the top face of the substrate portion 75 and comes into contact with the spring 34. Between the board-shaped protruding portion 77 and the engagement protruding portion 76, there is formed an engagement recess portion 78 into which the lock lever 28 fits to prevent the movable member 32 from moving inside the engagement groove 30. The bottom face of the engagement recess portion 78 is structured so as to have a height equal to the height of a bottom face portion of the operating groove 18b provided on the rotor 18 when the movable member 32 is disposed in the engagement groove 30.

Figure 2:
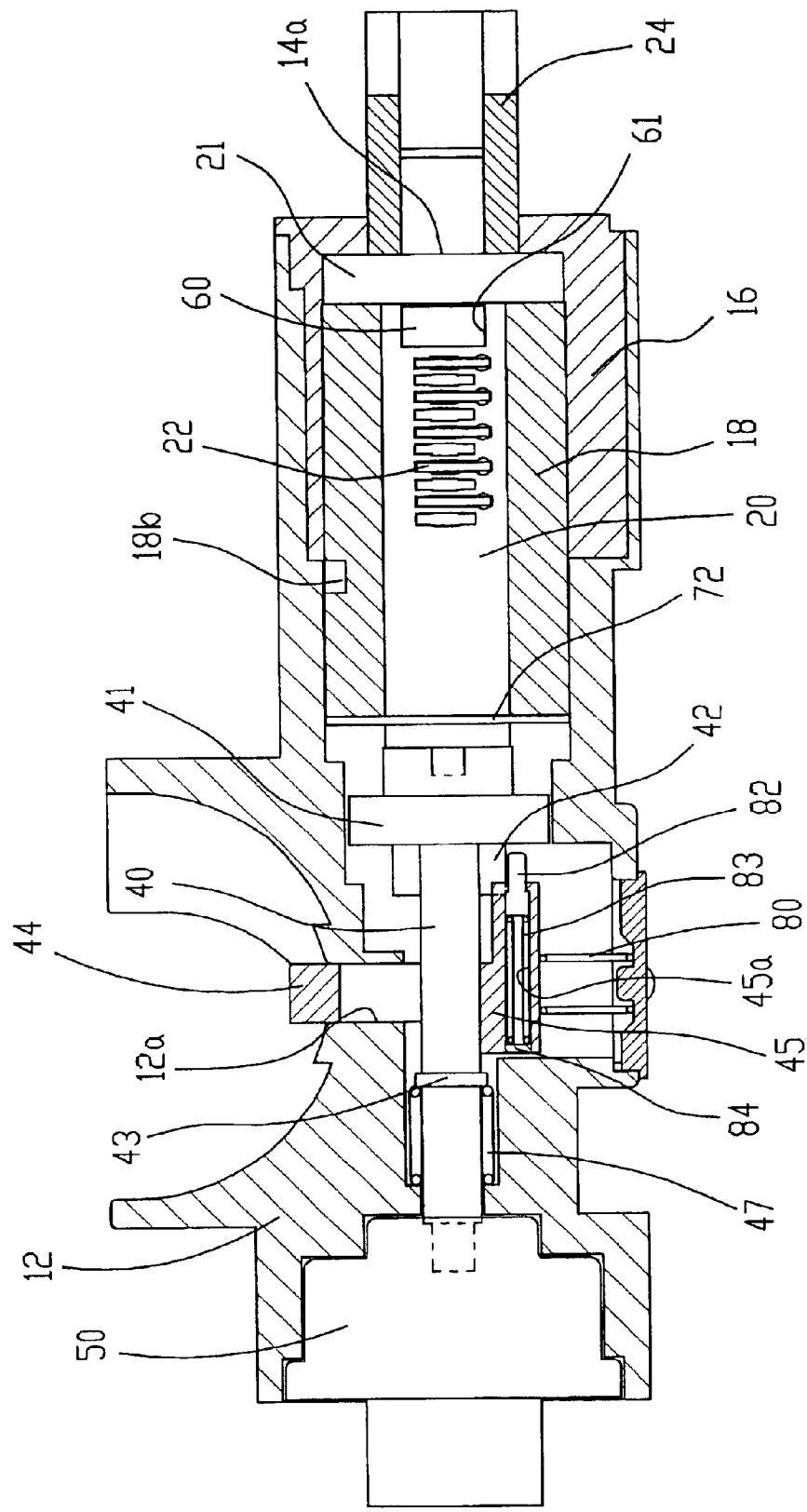
FIG. 2 is a longitudinal cross sectional view showing the steering lock apparatus of the present invention from a different angle.

With reference again to FIG. 1, the rear end portion of the cylinder 20 is connected to a shaft 40 that is integrally formed with a disk portion 41 protruding like a brim, a cam 42 for operating a later-described lock shaft 44, and a spring receiving portion 43 protruding like a brim. Between the spring receiving portion 43 and the body 12, is a spring 47. The spring 47 presses the shaft 40 toward the front side, by which the cylinder 20 and the rotor 18 are also pressed toward the front side. As shown in FIG. 2, a lock shaft 44 for locking an unshown steering shaft is pressed by a spring 80 to the cam 42 so as to be in contact with the cam 42. Consequently, rotating the cylinder 20 from the lock position to the ACC position rotates the shaft 40 and the cam 42, and retracts the lock shaft 44 to the lower side in FIG. 2. As a result, a top end portion of the lock shaft 44 is detached from a recess portion of the unshown steering shaft, by which the steering lock is unlocked.

The lock shaft 44 is movably installed in a hole 12a of the body 12, and a bottom end portion thereof is provided with a driven portion 45 that comes into contact with the cam 42. The driven portion 45 has a pin installation hole 45a for installing a pin 82 and a pin spring 83. The pin 82 and the pin spring 83 are included in the pin installation hole 45a by a plug 84. The pin 82 is pressed toward the disk portion 41 of the shaft 40 by the pin spring 83.

On the rear end portion of the body 12, there is an ignition switch 50. In the rear end portion of the shaft 40 extending through the ignition switch 50, there is a conducting portion 46 as shown in FIG. 1. Inside the ignition switch 50, there is a switch (detection element) 52 having two movable electrodes 53a, 53b projecting toward the conducting portion 46. The movable electrodes 53a, 53b of the switch 52 are pressed toward the conducting portion 46 side by an unshown spring and are movably disposed in the switch 52. The switch 52 is for detecting movement of the cylinder 20 and the rotor 18 to the rear side, the movement being detected by conduction between the two movable electrodes 53a, 53b generated by contact with the conducting portion 46 located on the rear end portion of the shaft 40 when the knob 24 is pushed toward the rear side.

The switch 52 is electrically connected to a controller (control element) 54. The controller 54 is electrically connected to the solenoid 26. Upon reception of a detection signal from the switch 52, the controller 54 performs electronic certification of an unlocking signal from an electronic key (portable device) 56 carried by a user, and upon recognition of certification, the controller 54 transmits an operating signal to the solenoid 26. Also, if an unlocking signal transmitted from the electronic key 56 at specified intervals is received after recognition of certification of the unlocking signal, the controller 54 determines that the user is out of the car and retransmits an operating signal to the solenoid 26.

Figure 15:
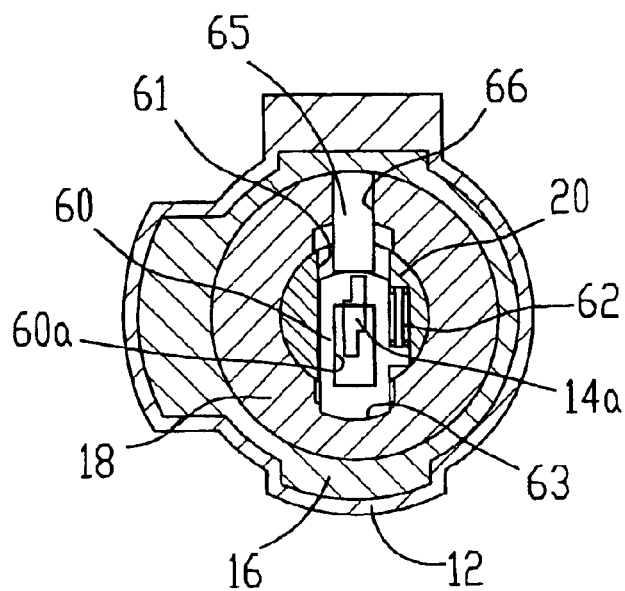
FIG. 15 is a cross sectional view of FIG. 13 taken along the line A—A.
Figure 16:
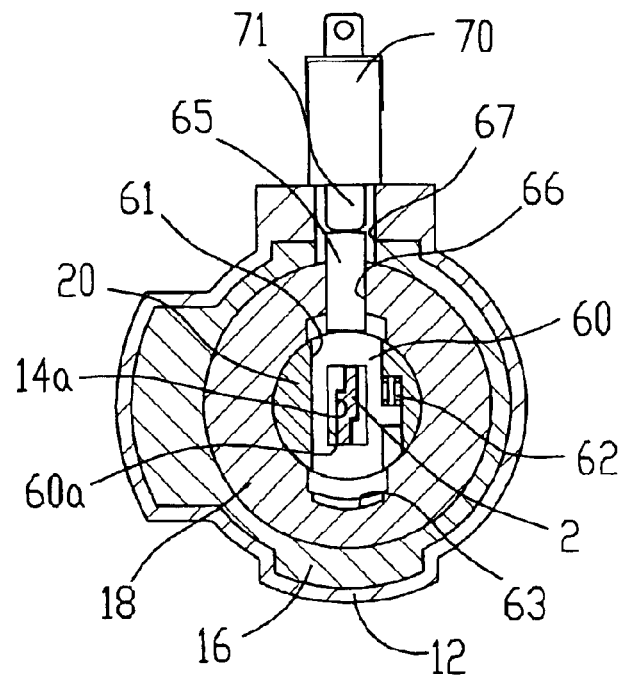
FIG. 16 is a cross sectional view of FIG. 14 taken along the line B—B.
Figure 17:
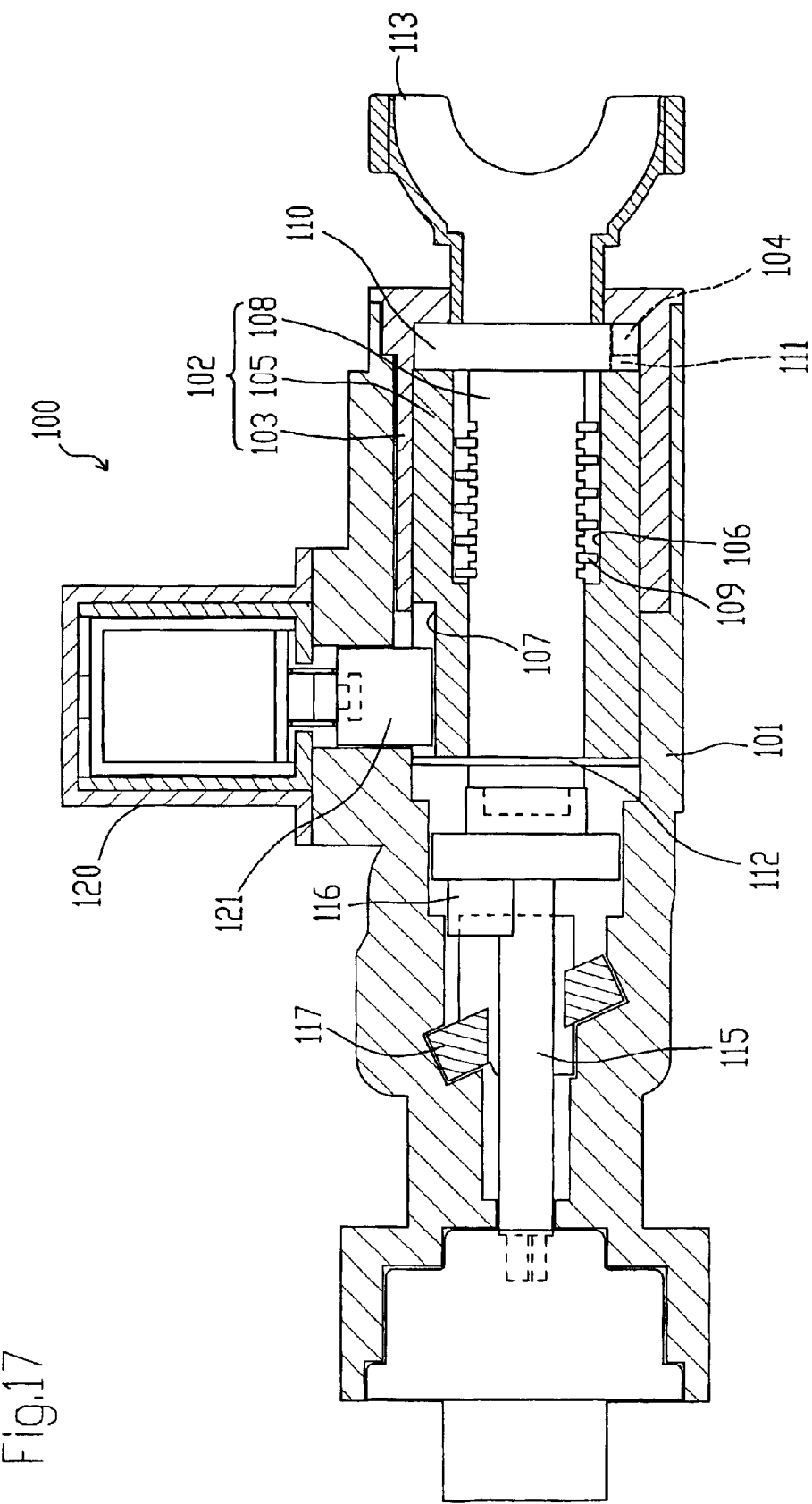
FIG. 17 is a longitudinal cross sectional view showing a conventional steering lock apparatus.
Figure 18:
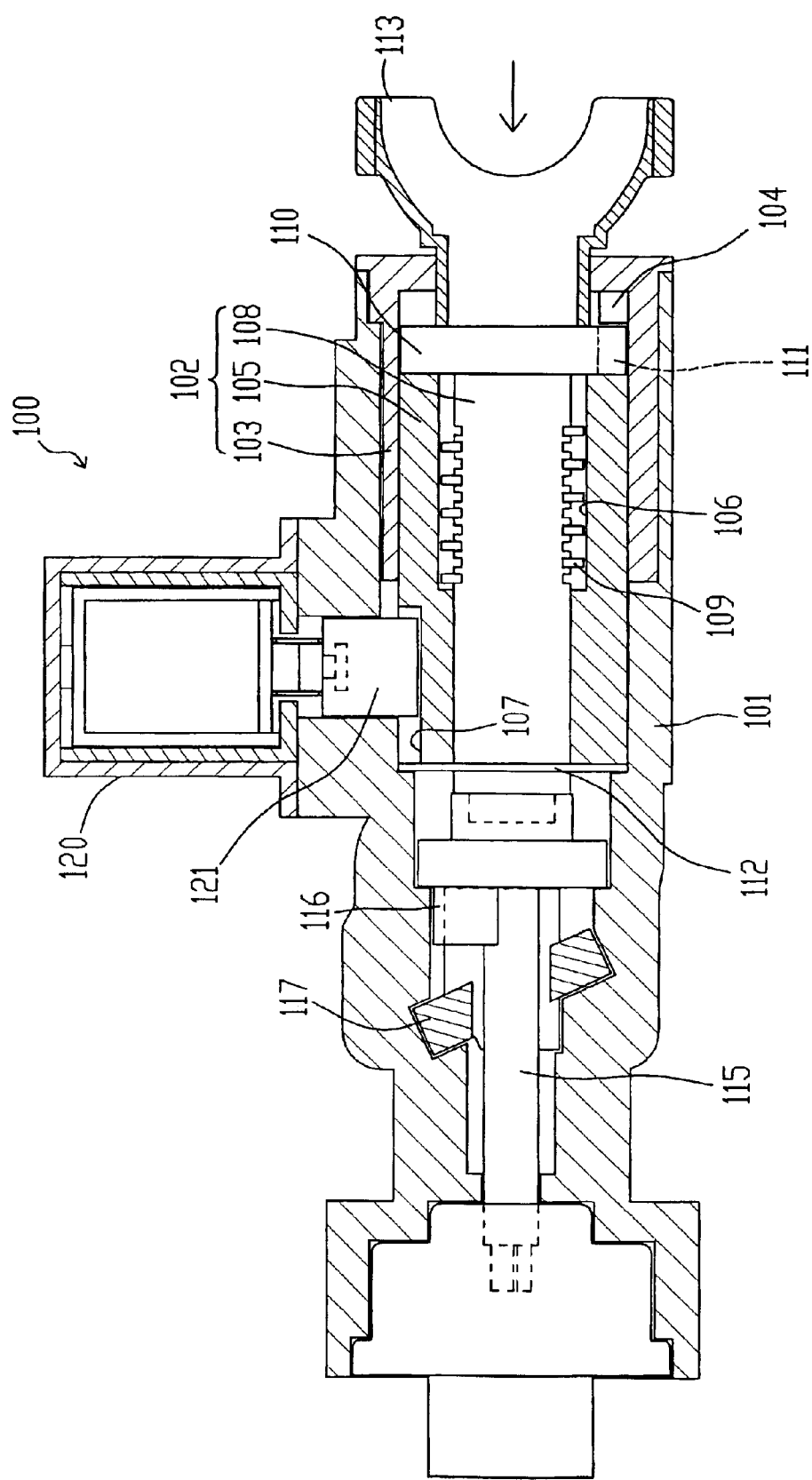
FIG. 18 is a longitudinal cross sectional view showing the steering lock apparatus of FIG. 17 with a knob being pushed.

On the front inside of the rotor 18, there is a slider 60 which can slide in a direction orthogonal to an axis direction of the cylinder 20. As shown in FIG. 15, the slider 60 is disposed in a slide hole 61 arranged in a radial direction of the cylinder 20, and is pressed by a spring 62 to the lower side in FIG. 15. An edge portion of slider 60 is fit into a recess portion 63 formed in the inner circumferential face of the rotor 18. The slider 60 has a rectangle-shaped key insertion hole 60a. The key insertion hole 60a is located so that at least part of the key hole 14a of the cylinder 20 is blocked when a mechanical key is not inserted. However, when the mechanical key is inserted, the key insertion hole is moved to a position that coincides with the position of the key hole 14a so that the both edge faces of the slider 60 coincide with the outer circumferential face of the cylinder 20 as shown in FIG. 16.

A slide pin 65 contacts the upper portion of the slider 60. As shown in FIG. 15, the slide pin 65 is housed in a housing hole 66 provided in a position corresponding to the slider 60 of the rotor 18 so as to be slidable in forward and backward directions together with the rotor 18. Also, the slide pin 65 is structured such that one end thereof contacts at least the edge portion of the slider 60 while the other end thereof protrudes from the outer circumferential face of the rotor 18 when the slider 60 is operated by insertion of a key. As shown in FIG. 16, on the lateral wall of the outer cylinder 16 and the body 12 in the vicinity of the slide pin 65, there is a receiving hole 67 which acts as a receiving recess portion into which the slide pin 65 (that is moved to the rear side) fits. The receiving hole 67 is formed so that the slide pin 65 fits into hole 67 when the cylinder 20 and the engagement protruding portion 17 of the outer cylinder 16 is released. A detection pin 71 of a key detection switch 70 mounted on the upper portion of the body 12 projects into the receiving hole 67. The detection pin 71 is pressed toward the inside of the steering lock apparatus 10 by an unshown spring so that the head thereof is brought into contact with the outer circumferential face of the rotor 18.

The following description discusses operation of the above-structured steering lock apparatus 10.

In the state prior to operation of the steering lock apparatus 10, the rotor 18, the cylinder 20, the slider 60, the slide pin 65, and the shaft 40 are pressed to the front side by the spring 47 as shown in FIG. 1, and the engagement groove 23 of the cylinder 20 is engaged with the engagement protruding portion 17 of the outer cylinder 16 so that the cylinder 20 is unable to rotate. As shown in FIG. 4, the rotor 18 is also unable to rotate since the lock lever 28 is inserted between the rotation preventing portion 76a of the engagement protruding portion 76 of the movable member 32 and the lateral wall of the engagement groove 30.

Figure 5:
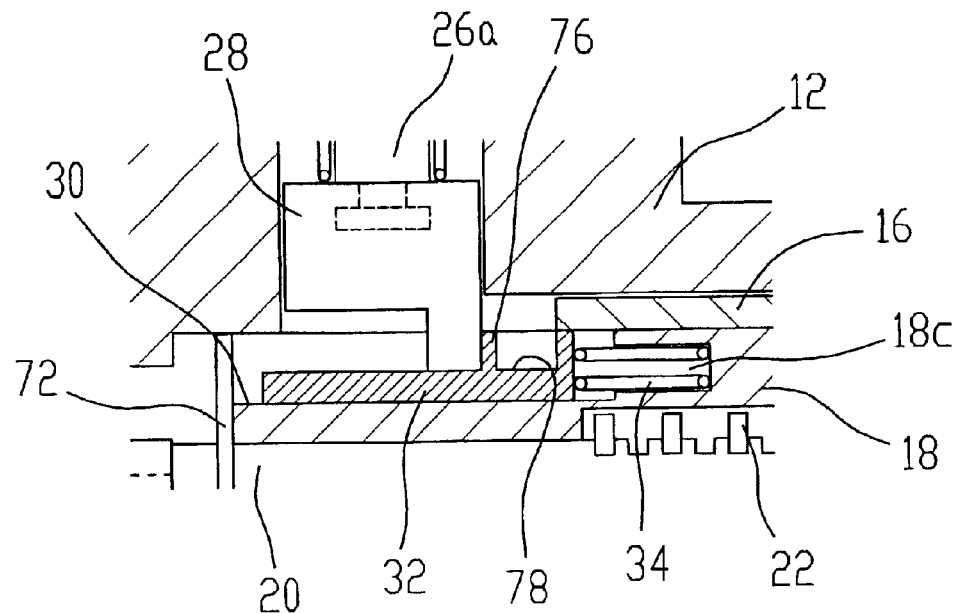
FIG. 5 is an enlarged fragmental view of FIG. 1.

For a user to start an engine using an electronic key, when the rotor 18 and the cylinder 20 are in the forward position, first the knob 24 is pushed toward an arrow A direction. Consequently, the rotor 18, the cylinder 20, the slider 60, the slide pin 65, and the shaft 40 are integrally moved to the rear. Here, as shown in FIG. 5, movement of the rotor 18 to the rear side compresses the spring 34, and the compressed spring 34 presses the movable member 32 toward the lock lever 28.

Also, pushing of the knob 24 brings the conducting portion 46 on the rear end of the shaft 40 into contact with the movable electrodes 53a, 53b of the switch 52. Consequently, the switch 52 detects that the knob 24 and the rotor 18 have been pushed to the rear side, and transmits a detection signal to the controller 54. Upon reception of the detection signal, the controller 54 receives a radio signal transmitted from the electronic key 56 carried by the user, and executes electronic certification with it. If the controller 54 recognizes certification, it transmits an operating signal to the solenoid 26.

Figure 6:
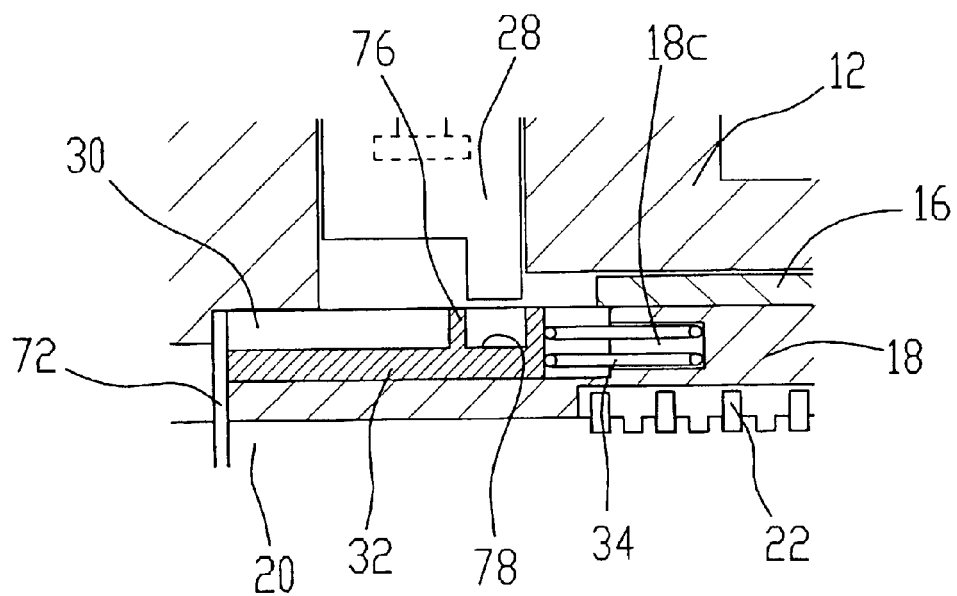
FIG. 6 is an enlarged fragmental view of FIG. 1.

The solenoid 26 is operated by the operating signal from the controller 54, by which the plunger 26a is retracted. Consequently, the lock lever 28 connected to the plunger 26a is lifted up, which releases engagement between lock lever 28 and the engagement groove 30 of the rotor 18 and the movable member 32, and allows rotation of the rotor 18. At the same time, as shown in FIG. 6, the movable member 32 pressed by the spring 34 is moved under the lock lever 28 lifted up by plunger 26a, so that the engagement recess portion 78 of the movable member 32 is moved to a position corresponding to the top end portion of the lock lever 28.

Figure 7:
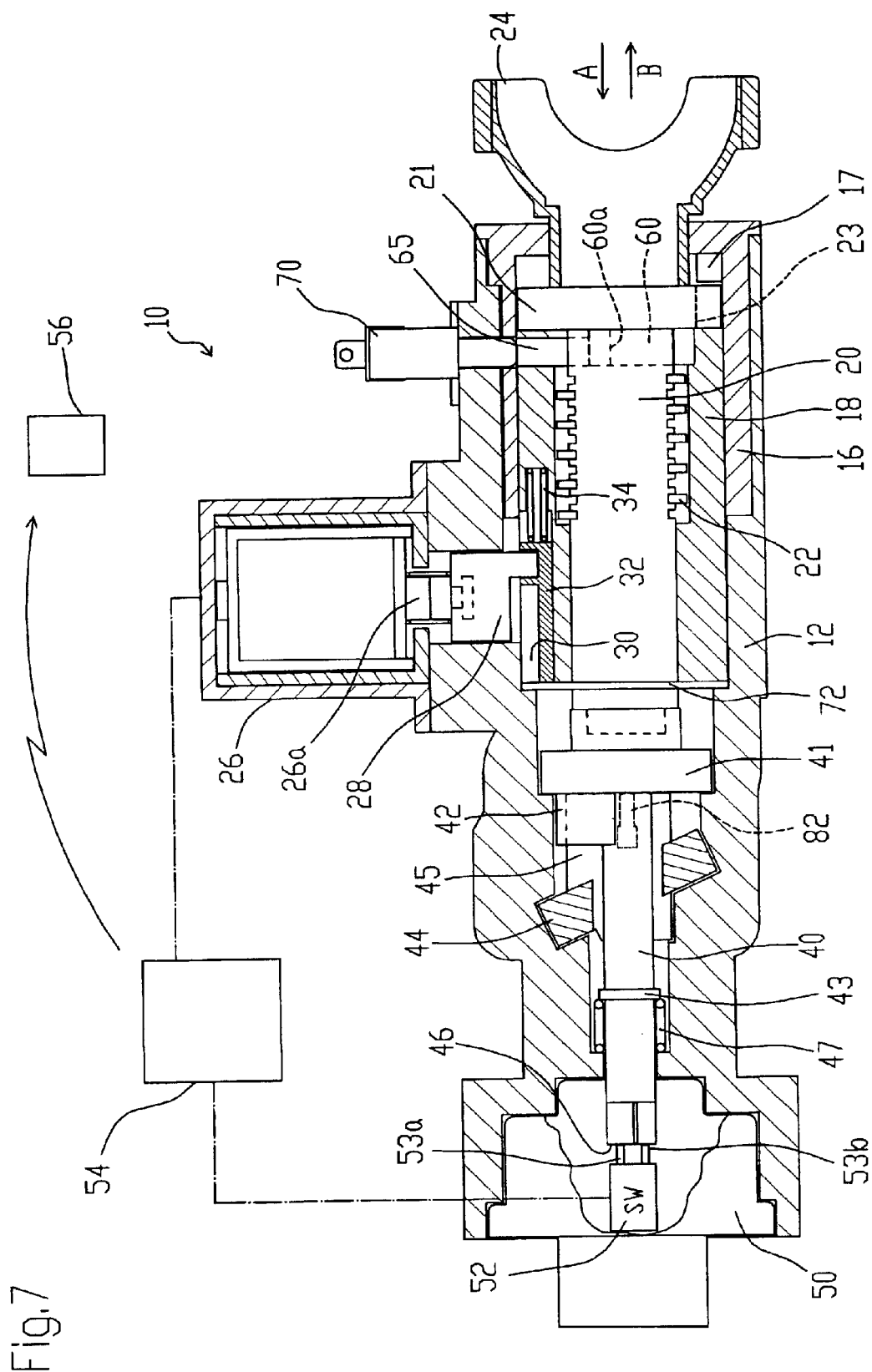
FIG. 7 is a longitudinal cross sectional view showing the steering lock apparatus with a knob being pushed.

Then, when the rotor 18, the cylinder 20, the slider 60, the slide pin 65, and the shaft 40 move to the position shown in FIG. 7, engagement of the engagement groove 23 of the cylinder 20 and the engagement protruding portion 17 of the outer cylinder 16 is released, which allows rotation of the cylinder 20 and the rotor 18.

The period of time from start of the pushing operation of the knob 24 to detachment of the lock lever 28 from the engagement groove 30 of the rotor 18 is shorter than a period of time necessary for releasing engagement of the engagement groove 23 of the cylinder 20 and the engagement protruding portion 17 of the outer cylinder 16. Consequently, rotating operation of the knob 24 is disabled until complete detachment of the lock lever 28 from the engagement groove 30 of the rotor 18. As a result, occurrence of failures such as the lock lever 28 being caught by the rotation preventing portion 76a of the engagement protruding portion 76 of the movable member 32 and to create an inoperative state are prevented.

Figure 8:
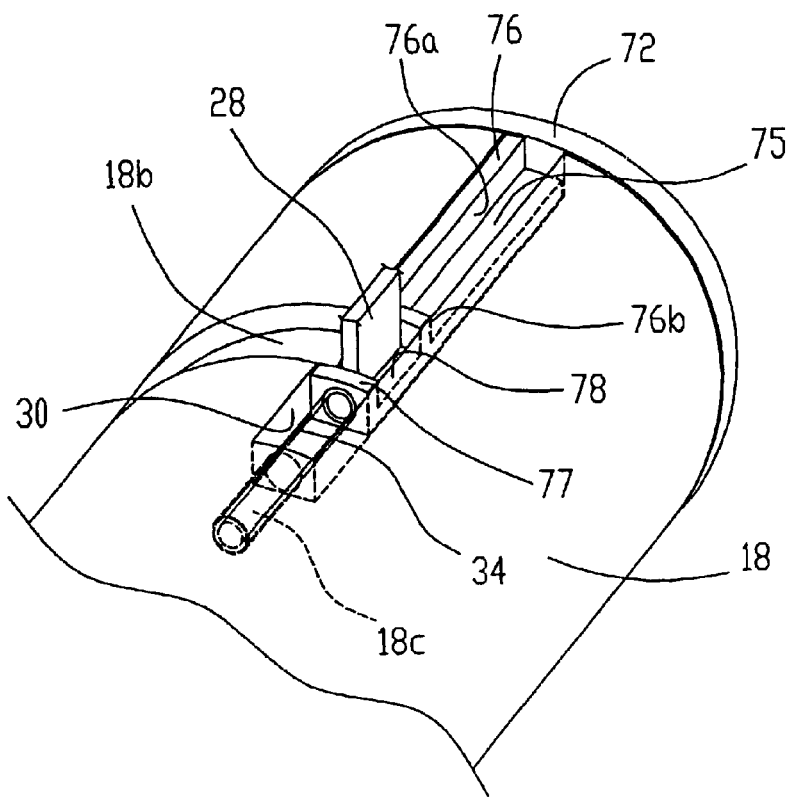
FIG. 8 is an enlarged fragmental perspective view of FIG. 7.

Operation of the solenoid 26 is turned off after lapse of a specified period of time, and the plunger 26a projects from the solenoid 26 to lower the lock lever 28. Here, as shown in FIGS. 7 and 8, the bottom end portion of the lock lever 28 fits into the engagement recess portion 78 of the movable member 32. In this state, the engagement recess portion 78 of the movable member 32 and the operating groove 18b of the rotor 18 are interlocked, which enables clockwise rotating operation of the rotor 18, and prevents an attempt to operate the knob 24 forward because the lock lever 28 engages with the engagement recess portion 78 of the movable member 32 or the operating groove 18b of the rotor 18.

In this state, the user rotates the knob 24 for rotating the cylinder 20 and the rotor 18 from the lock position to the ACC position, the On position, and the start position, so as to operate the ignition switch 50 through the shaft 40 for starting the engine.

Figure 10:
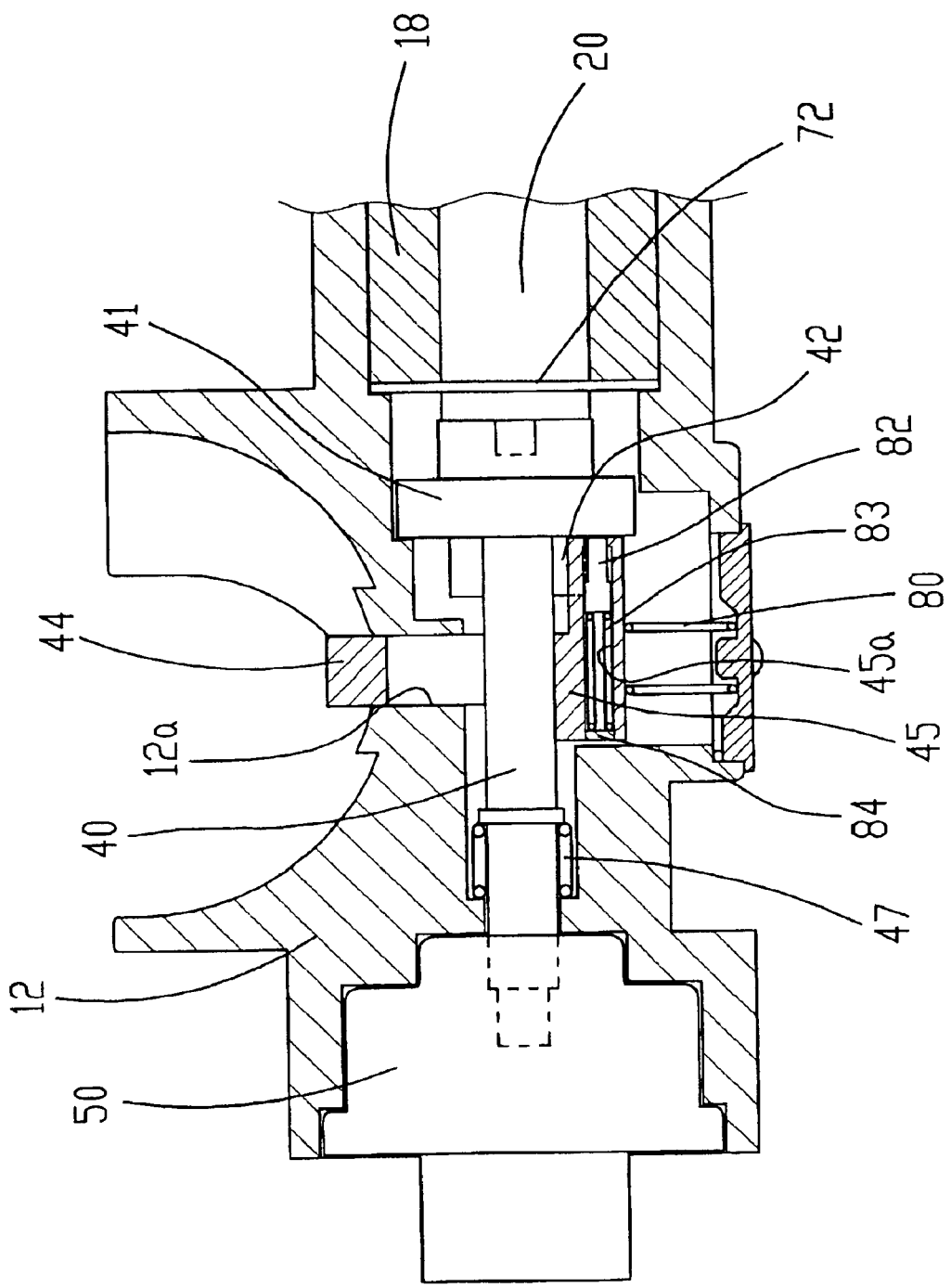
FIG. 10 is a longitudinal cross sectional view showing the state of a lock shaft of the steering lock apparatus of FIG. 7.
Figure 11:
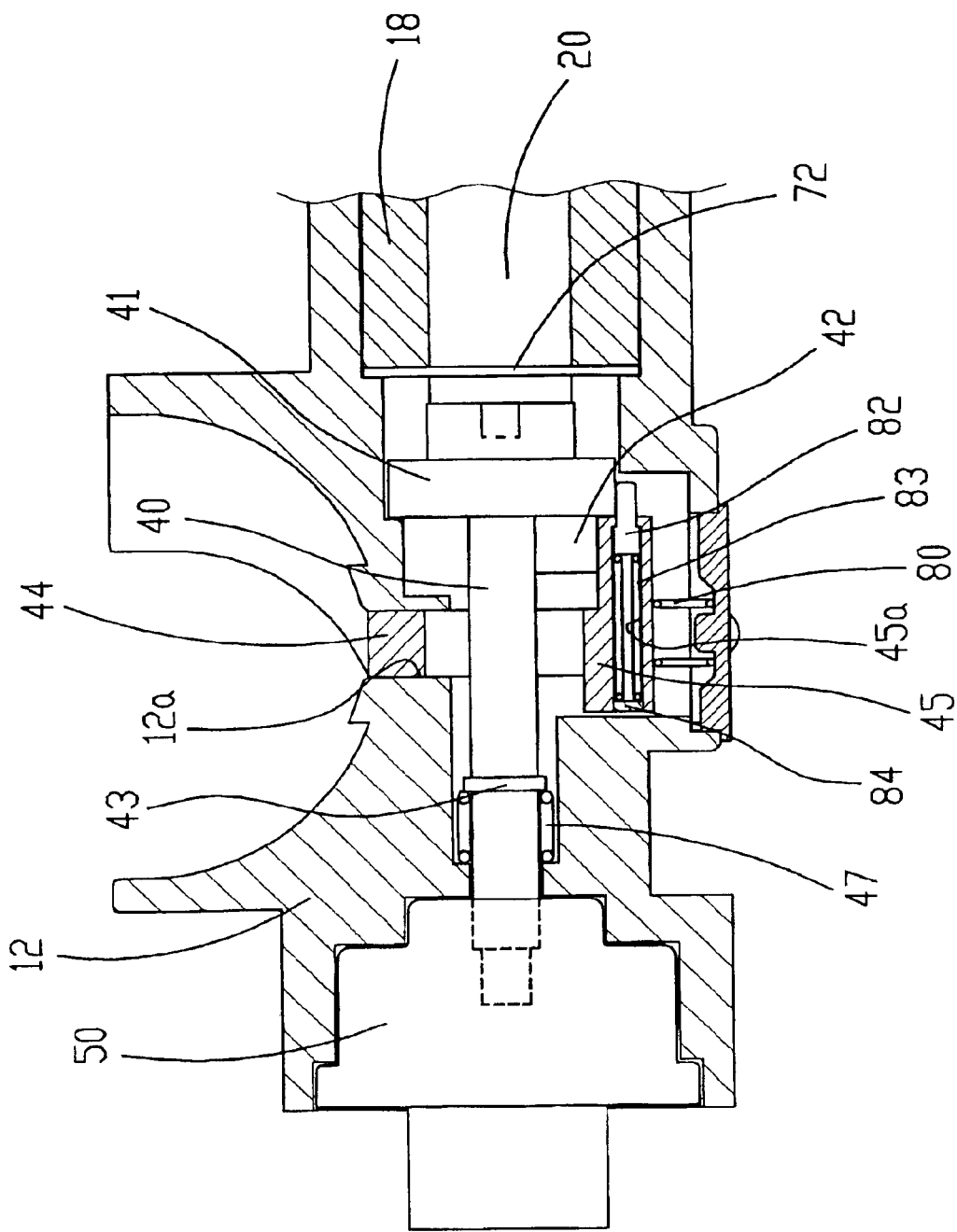
FIG. 11 is a longitudinal cross sectional view showing the lock shaft of the steering lock apparatus of FIG. 7 being unlocked.

As for the lock shaft 44, in response to movement of the cylinder 20, the pin 82 is pressed by the disk portion 41 against the pressing force of the pin 83 and moved into the driven portion 45 of the lock shaft 44 as shown in FIG. 10. Then, the cylinder 20 and the rotor 18 rotate from the lock position to the ACC position, so the shaft 40 and the cam 42 rotate together with them to move the lock shaft 44, by which the top end portion of the lock shaft 44 is detached from the recess portion of the steering shaft, and the steering lock is unlocked. At this point, the pin 82 of the lock shaft 44 moves to the position shown in FIG. 11, by which the pin 82 is out of contact with the disk portion 41, so that the head of the pin 82 projects into almost the central position of the outer circumferential wall of the disk portion 41 by the pressing force of the spring 83. In this state, even if the cylinder 20 and the rotor 18 are rotated from the ACC position to the lock position to rotate the cam 42 in locking direction, the pin 82 engages with the outer circumferential wall of the disk portion 41 to keep the lock shaft 44 in the unlock position, which disables locking of the steering shaft.

When a user gets out of an automobile, the user rotates the knob 24 to the lock position and then leaves the automobile with the electronic key 56, so that the controller 54 detects the driver leaving the automobile and operates the plunger 26a of the solenoid 26 upward for a specified period of time. As a consequence, engagement of the lock lever 28 and the engagement recess portion 78 of the movable member 32 is released, by which the shaft 40, the cylinder 20, and the rotor 18 are moved forward by the pressing force of the spring 47. Then, after operation of the solenoid 26 is completed, the plunger 26a projects from the solenoid 26 so that the lock lever 28 lowers and enters into the engagement groove 30 of the rotor 18 to return to the state prior to operation shown in FIG. 1, and the rotor 18 is locked. Here, movement of the cam 42 releases engagement of the pin 82 of the lock shaft 44 and the disk portion 41, and the pressing force of the spring 80 moves the lock shaft 44 to the steering shaft side, by which the steering shaft is locked.

Figure 9:
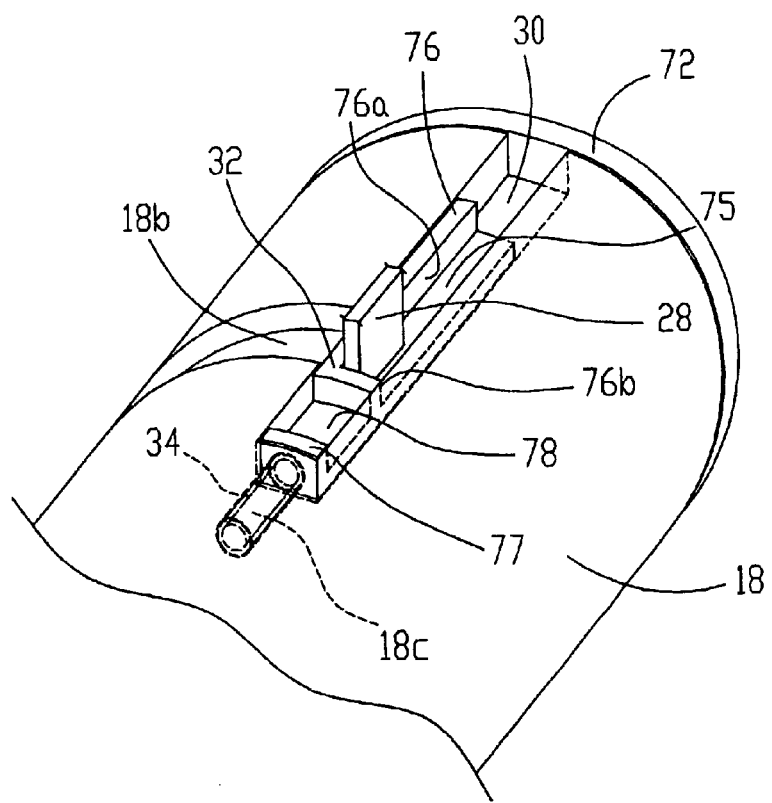
FIG. 9 is an enlarged fragmental perspective view of FIG. 7.

It is noted that if certification of the electronic key 56 is not recognized during the certificating operation of the electronic key 56, operating the knob 24 to the rear side will not operate the solenoid 26, so that the lock lever 28 is left as being inserted into the engagement groove 30 of the rotor 18 as shown in FIG. 9. Thus, the rotating operation of the rotor 18 is obstructed by the rotation preventing portion 76a of the engagement protruding portion 76 of the movable member 32 and the lateral wall of the engagement groove 30 of the rotor 18, as a consequence of which the steering lock cannot be unlocked.

The steering lock apparatus 10 is operable not only with the knob 24 but also with a mechanical key. In inserting the mechanical key to the key hole 14a of the cylinder 20 through a slit-shaped internal space of the knob 24, since the key insertion hole 60a of the slider 60 is displaced from the key hole 14a of the cylinder 20, and the slide pin 65 is present between the slider 60 and the cylinder outer 16 as shown in FIG. 13 and FIG. 15, the mechanical key 2 cannot be inserted into the cylinder 20 in this state.

Figure 13:
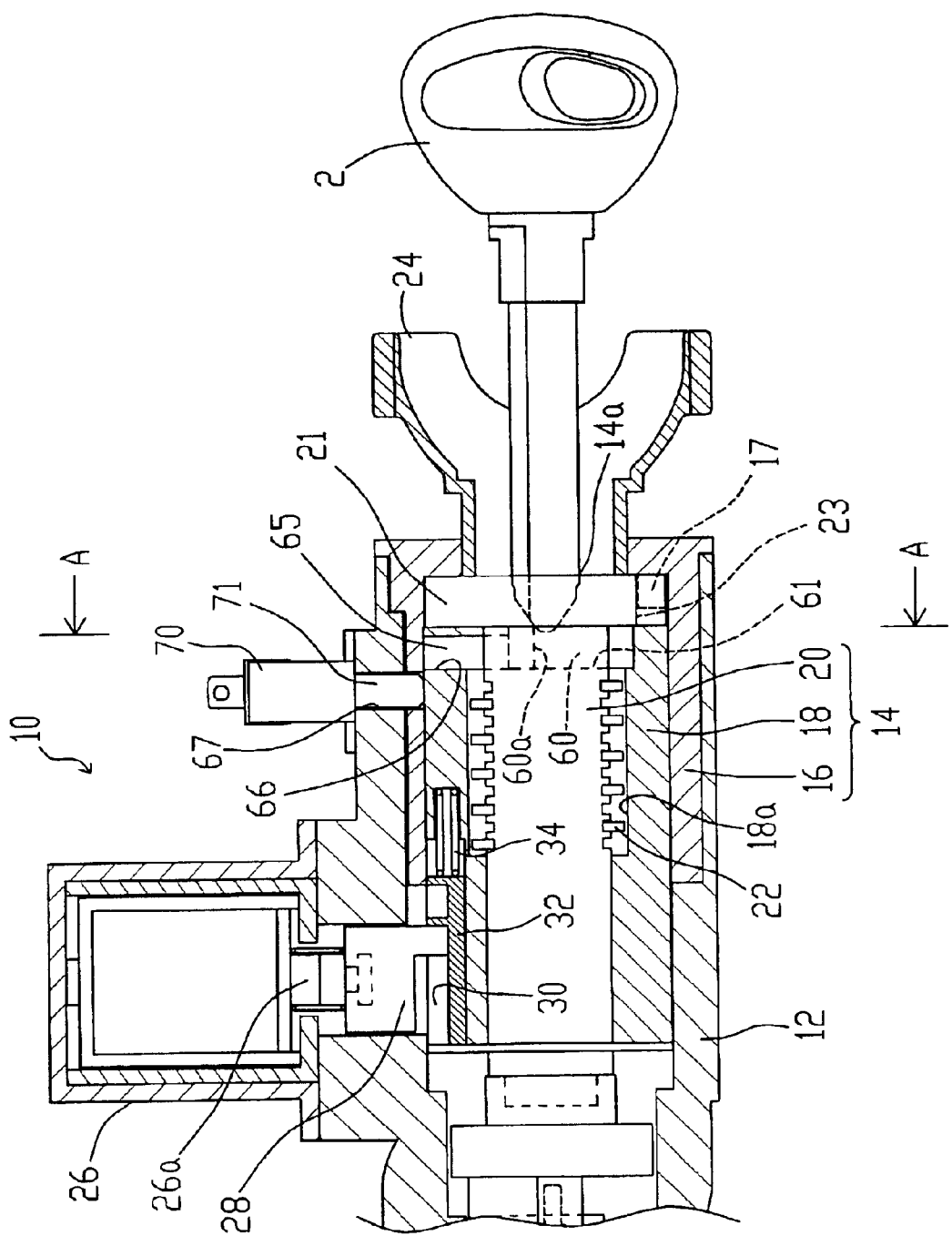
FIG. 13 is a longitudinal cross sectional view showing the steering lock apparatus with a mechanical key being about to be inserted.
Figure 14:
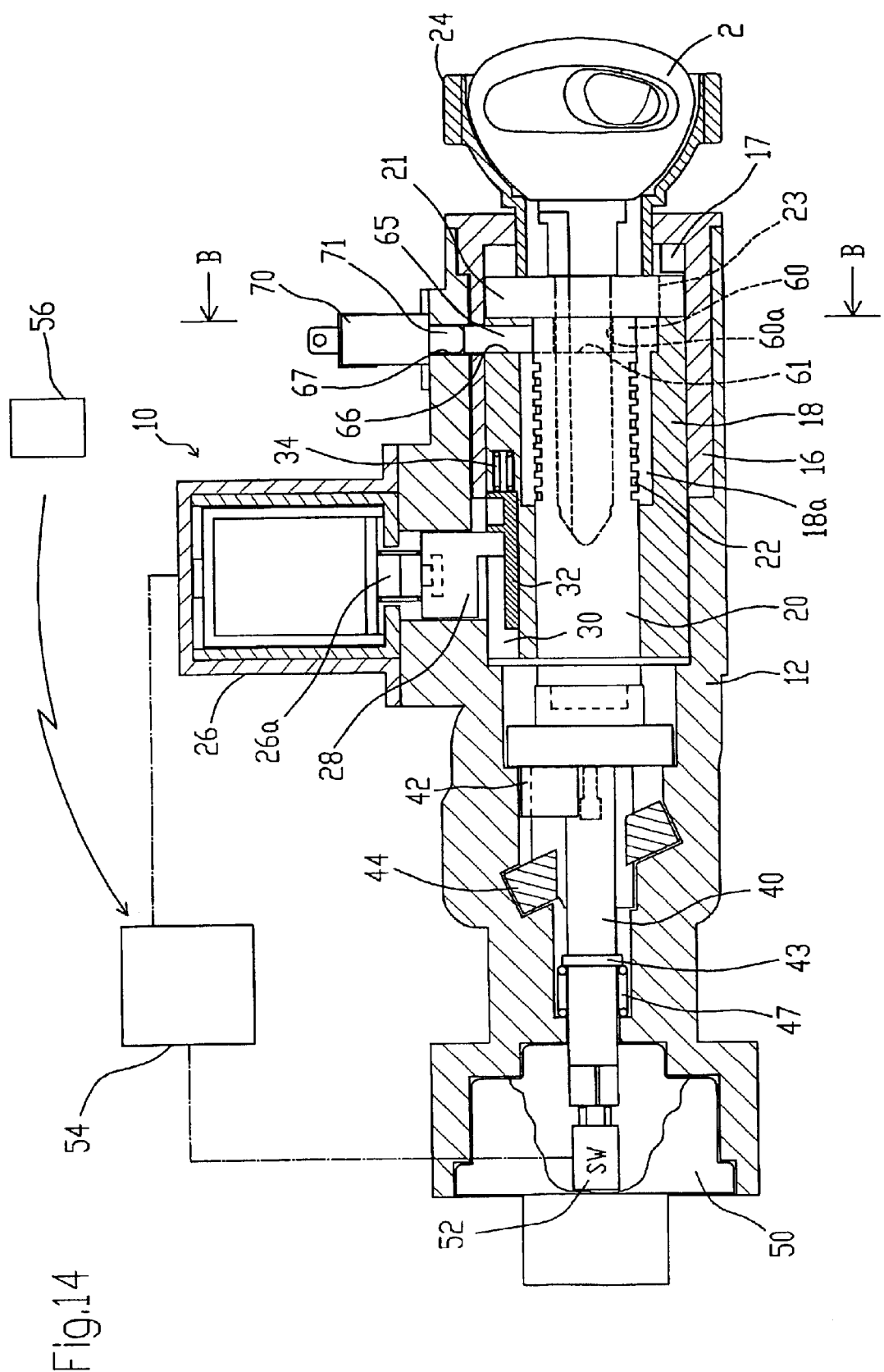
FIG. 14 is a longitudinal cross sectional view showing the steering lock apparatus with the mechanical key being inserted.

Accordingly, pushing the mechanical key 2 when the top end thereof is lightly inserted into the key hole 14a of the cylinder 20 as shown in FIG. 13 brings an inclined face of the top end of the mechanical key 2 into contact with the outer circumferential wall of the key insertion hole 60a of the slider 60. Further pushing the mechanical key 2 into the cylinder 20 integrally moves the slider 60, the slide pin 65, the cylinder 20 and the rotor 18 backward as shown in FIG. 14. Consequently, the slide pin 65 enters into the receiving hole 67 on the inner circumferential face of the outer cylinder 16, which makes the slider 60 slidable in the longitudinal direction (direction orthogonal to the axis of the cylinder 20). As a result, the key insertion hole 60a of the slider 60 is aligned with the key hole 14a of the cylinder 20 as shown in FIG. 16, which enables complete insertion of the mechanical key 2 into the cylinder 20. This ensures movement of the cylinder 20 to the position where engagement of the engagement groove 23 of the cylinder 20 with the engagement protruding portion 17 of the outer cylinder 16 is released, so the cylinder 20 is put in a rotatable state.

Both end faces of the slider 60 are set to have full surface match with the outer circumferential face of the cylinder 20 when the mechanical key 2 is inserted. Therefore, the slider 60 and the slide pin 65 will not obstruct rotation of the cylinder 20.

The slide pin 65 enters into the receiving hole 67 on the inner circumferential face of the outer cylinder 16 so that the detection pin 71 of the key detection switch 70 is pushed, by which insertion of the mechanical key 2 is detected. The detection of key insertion is utilized for warning to prevent forgetting to extract the key and the like.

Since unlocking of the steering lock, unlocking of the rotor 18 by electronic certification, and operation of the movable member 32 when using the mechanical key 2 are identical to those in the case of using the above-described knob 24, repeated description thereof is omitted. It is noted, however, that even if the solenoid 26 is operated to unlock the lock of the rotor 18, the slide pin 65 engages both the rotor 18 and the cylinder outer 16. Therefore, only the cylinder 20 rotates and the rotor 18 does not rotate when the mechanical key 2 is rotated.

In the case where key insertion is detected by the key detection switch 70, control may be performed with the controller 54 so as not to execute electronic certification nor operation of the solenoid 26. In this case, the lock lever 28 is still in engagement with the engagement groove 30, and the rotor 18 is locked, so that only the cylinder 20 rotates by rotation of the mechanical key 2.

When the mechanical key 2 is inserted into the cylinder 20, the cylinder 20 fixed on the rotor 18 cannot be moved forward even if it is attempted to move the knob 24 to the front side since the slide pin 65 is positioned so as to cross over the rotor 18 and the cylinder outer 16. This prevents unexpected locking of the steering due to inadvertent movement of the knob 24 toward the front side during driving.

When the mechanical key 2 is removed from the cylinder 20, the detection pin 71 of the key detection switch 70 presses the slide pin 65 toward inside of the rotor 18 until one end of the slide pin 65 matches with the outer circumferential face of the rotor 18, and the slider 60 is operated by the pressing force of the spring 62 to put the slide pin 65 into the rotor 18, by which the lock of the rotor 18 is unlocked. Consequently, the shaft 40, the cylinder 20, the rotor 18, the slider 60, and the slide pin 65 are moved forward by the pressing force of the spring 47 to be returned to their position prior to insertion of the mechanical key 2.

In the present embodiment, when the mechanical key 2 is removed from the cylinder 20, the slide pin 65 is pressed by the key detection switch 70, and the slider 60 is pressed by the spring 62 so as to be returned to the position prior to insertion of the mechanical key 2. However, the spring 62 may be omitted if the detection pin 71 of the key detection switch 70 is imparts a pressing force large enough to surely return the slide pin 65 and the slider 60 to their position prior to key insertion.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A steering lock apparatus, comprising:

a rotatable cylinder having a key hole;

a rotor rotatably supporting said cylinder therein, said rotor having an engagement groove formed on an outer surface thereof;

a body for accommodating said cylinder and said rotor therein such that said cylinder and said rotor are operable to move in a forward axial direction and a backward axial direction with respect to said body, and such that said cylinder and said rotor are rotatable with respect to said body when located in a rear position, said body having a receiving recess formed therein;

a detection element for detecting a movement of said cylinder in the backward axial direction;

a control element operable to receive a detection signal from said detection element, operable to execute electronic certification with a portable device, and operable to transmit an operating signal upon recognition of certification;

a lock member operable to engage said engagement groove of said rotor so as to prevent rotation of said rotor;

an actuator operable to actuate said lock member so as to allow rotation of said rotor after receiving the operating signal transmitted by said control element; and a key detection member operable to move between an engaged position, whereat said key detection member protrudes from said rotor into said receiving recess of said body when said cylinder is located in the rear position, and a non-engaged position, whereat said key detection member does not protrude from said rotor when said cylinder is located in a forward position.

2. The steering lock apparatus of claim 1, wherein said key detection member is shaped and arranged so as to obstruct at least a portion of said key hole when located in the non-engaged position.

3. The steering lock apparatus of claim 1, wherein said key detection member comprises:

a slider having a first end and being arranged in said cylinder, said slider being shaped and arranged so that said first end is flush with an outer circumferential surface of said cylinder when said key detection member is located in the engaged position; and a slide pin having a first end and a second end, said slide pin being arranged in said rotor so that said first end of said slide pin contacts said first end of said slider and so that said second end of said slide pin protrudes from said rotor when said key detection member is located in the engaged position.

4. The steering lock apparatus of claim 3, further comprising a pressing mechanism for pressing said key detection member toward a central longitudinal axis of said cylinder.

5. The steering lock apparatus of claim 4, wherein said pressing mechanism comprises a key detection switch inside said receiving recess of said body, said key detection switch being operable to push said slide pin to a position whereat said second end of said slide pin is flush with an outer circumferential surface of said rotor when said key detection member is located in the non-engaged position.

6. The steering lock apparatus of claim 1, further comprising a pressing mechanism for pressing said key detection member toward a central longitudinal axis of said cylinder.

7. The steering lock apparatus of claim 6, wherein said pressing mechanism comprises a key detection switch inside said receiving recess of said body, said key detection switch being operable to push a slide pin of said key detection member to a position whereat an end of said slide pin is flush with an outer circumferential surface of said rotor when said key detection member is located in the non-engaged position.

8. The steering lock apparatus of claim 1, wherein said key detection member is operable to move orthogonal to a longitudinal axis of said rotor and said cylinder, and is arranged so as to engage said body when in the engaged position.

* * * * *